(12) United States Patent
Li et al.

(10) Patent No.: US 11,446,857 B2
(45) Date of Patent: Sep. 20, 2022

(54) INTELLIGENT MODULE PIPELINE, INTELLIGENT MODULE HELICAL PIPELINE WINDING MACHINE AND A WINDING METHOD THEREFOR

(71) Applicant: Li Li, Chongqing (CN)

(72) Inventors: Li Li, Chongqing (CN); Yiqing Chen, Chongqing (CN); Shengbin Zou, Chongqing (CN); Siyi Li, Chongqing (CN); Qiaoxi Feng, Chongqing (CN)

( * ) Notice: Subject to any disclaimer, the term of this patent is extended or adjusted under 35 U.S.C. 154(b) by 567 days.

(21) Appl. No.: 16/498,846

(22) PCT Filed: Mar. 23, 2018

(86) PCT No.: PCT/CN2018/080249
§ 371 (c)(1),
(2) Date: Sep. 27, 2019

(87) PCT Pub. No.: WO2018/177215
PCT Pub. Date: Oct. 4, 2018

(65) Prior Publication Data
US 2021/0129414 A1    May 6, 2021

(30) Foreign Application Priority Data

Mar. 28, 2017    (CN) .......................... 201710192176.5
Mar. 28, 2017    (CN) .......................... 201720310857.2
(Continued)

(51) Int. Cl.
*F16L 9/22*    (2006.01)
*B29C 53/72*    (2006.01)
*F16L 9/16*    (2006.01)

(52) U.S. Cl.
CPC ................ *B29C 53/72* (2013.01); *F16L 9/16* (2013.01); *F16L 9/22* (2013.01)

(58) Field of Classification Search
CPC ....... F16L 9/16; F16L 9/22; F16L 9/12; F16L 9/003; F16L 9/00; F16L 11/16; F16L 19/07; B29C 53/72
(Continued)

(56) References Cited

U.S. PATENT DOCUMENTS 1,381,119 A * 6/1921 Hastings .................. E21D 11/08
                                                                    52/707
1,923,006 A * 8/1933 Proctor .................... F16L 9/22
                                                                    29/897.3
(Continued)

*Primary Examiner* — Charles P. Cheyney
(74) *Attorney, Agent, or Firm* — Novoclaims Patent Services LLC; Mei Lin Wong

(57) ABSTRACT

An intelligent module pipeline, an intelligent module helical pipeline winding machine and a winding method thereof. In the cross section of the pipeline, a plurality of intelligent modules (1) are clamped and helically wound end to end to form a circular pipeline; each of the intelligent module units is an arch-shaped module which is formed by injection molding or compression molding; the each intelligent module unit is provided a reinforcing rib structure inside, a fixing device for fixing and clamping from left to right on the side surfaces, and a clamping device for fixing and clamping end to end at the edges. An arc-shaped chute rail is provided on the front surface of a working panel of the winding machine; the arc-shaped chute rail is provided with at least one pair of feed rollers (107), and is further provided with a locking device (108) and a parallel twisting device (106); the same intelligent module units are arranged end to end on the arc-shaped chute rail, and then are locked by means of the locking device, to form a semicircular pipe diameter by means of the feed rollers; then the parallel twisting device twists the semicircular pipe diameter in parallel to change the winding rail; and the intelligent module units are wound in a staggered arrangement to form helical winding pipelines.

20 Claims, 4 Drawing Sheets

US 11,446,857 B2
Page 2

(30) Foreign Application Priority Data

Jul. 6, 2017 (CN) .......................... 201710547452.5
Jul. 6, 2017 (CN) .......................... 201720813715.8

(58) Field of Classification Search
USPC ................................. 138/155, 157, 120, 104
See application file for complete search history.

(56) References Cited

U.S. PATENT DOCUMENTS

| | | | | |
|---|---|---|---|---|
| 1,969,810 A * | 8/1934 | McAlpine | ............... | E21D 11/04 |
| | | | | 405/151 |
| 3,815,370 A * | 6/1974 | Lennox | ................. | E21D 11/083 |
| | | | | 405/152 |
| 3,969,906 A * | 7/1976 | McBean | ................. | E21D 19/04 |
| | | | | 405/146 |
| 4,647,256 A * | 3/1987 | Hahn | ........................ | F16L 9/22 |
| | | | | 138/155 |
| 5,066,167 A * | 11/1991 | Siegfried | ................ | E04G 21/12 |
| | | | | 52/223.3 |
| 5,295,764 A * | 3/1994 | Cunat | ..................... | E21D 11/15 |
| | | | | 52/800.1 |
| 9,518,692 B2 * | 12/2016 | Kamiyama | ........... | F16L 55/165 |
| 10,746,022 B2 * | 8/2020 | Khorshidi | ............. | E21D 11/385 |
| 2011/0259462 A1 * | 10/2011 | Gaigler | ..................... | F03G 7/05 |
| | | | | 29/897.3 |
| 2014/0345739 A1 * | 11/2014 | Graham | ................ | F16L 11/083 |
| | | | | 138/120 |
| 2015/0075664 A1 * | 3/2015 | Cormier | ................. | E01F 5/005 |
| | | | | 138/121 |

* cited by examiner

INTELLIGENT MODULE PIPELINE, INTELLIGENT MODULE HELICAL PIPELINE WINDING MACHINE AND A WINDING METHOD THEREFOR

TECHNICAL FIELD

The present invention generally relates to a production equipment for a plastic pipeline (specially for a large plastic pipeline), particularly to an intelligent module pipeline, an intelligent module helical pipeline winding machine and a winding method thereof.

BACKGROUND

In the prior art, there are a wide variety of plastic buried pipelines. Plastic pipelines around the world such as large aperture spiral winding pipes, PVC, and PE pipes are all extrusion moulded, which is troublesome for transportation and process of construction of pipelines, especially the large aperture pipelines whose ring-stiffness are hardly increased. In the application, the modularization of pipes is such achieved that the module units for a pipeline can be injection or compression moulded at factories, then are assembled as building blocks and then are formed into pipeline on site. Moreover, in the prior art, after pipelines are buried underground, it is impossible to check quickly where there is a leakage. Thus, it is very urgent to provide a pipeline with the function of leakage alarm and a pipeline assembled in modularization. As proposed in Central Urbanization Work Conference, in the design of the urban drainage system, it is a priority that limited rainwater should be reserved, discharge of water should be made by the more use of natural power, and a sponge city should be constructed with natural deposition, natural infiltration and natural purification. The sponge city which is a concept of stormwater management in a new generation of city, i.e. the international language, is a construction of rainwater system with the idea of Low Impact Development, and is meant to have good flexibility on some aspects such as adaptation to the changes of environment and responding to natural disasters caused by rainwater. When storm occurring, water is easily accumulated locally in roads, holes of drainage pipeline on both sides of roads with limited cross section cause a small amount of drainage. Moreover, it is a difficult to solve the problem of waterlogging all over the world.

The present invention aims to solve the above problems. On the precondition of ensuring the function of a pipeline, sponge holes are provided in the module units located on the two sides of the pipeline, such that they are opened when it is raining, to absorb collected rainwater, thereby the rainwater flowing into rainwater collection slots, and flowing into special rainwater tanks when it has certain exceeded amount. Thus, a large amount of water resource is saved.

Besides the all pipelines above described, spiral winding pipelines with PVC modularization and high ring-stiffness in an application with the same applicant as the invention, whose application number is 201621090609.3, are extrusion moulded. Thus, the module units are not formed into an integral unity, need to have a secondary process and need to be wound by frames to form a pipeline, and the frames need to be wound with plate materials due to the impossibility of manual assembly, thus resulting in a high cost.

In the prior art, there are a wide variety of plastic buried pipelines. Plastic pipelines around the world such as large aperture spiral winding pipes, PVC, and PE pipes are all extrusion moulded, which is troublesome for transportation and process of construction of pipes, especially the large aperture pipes whose ring-stiffness are hardly increased. In the application, the modularization of pipes is achieved, and a modularized spiral pipeline winding machine is provided.

In an invention application applied previously by the present applicant, whose application number is CN02133755.1, is provided a multifunctional spiral pipe winding machine which determines pipeline diameter by means of circular arc rail. In the present invention whose Chinese application number is 2017101921765, application date is Mar. 28, 2017, and title is modularized intelligent pipeline, a circular arc formed of injection moulded or compression moulded intelligent module units combined in an arc-shaped way, replaces the track provided in the previous application.

In the invention, the circular arc formed of arched-shaped module units connected end to end instead of the track of the circle in the machine, enable the winding machine wind a pipeline only by means of a pair of rollers, achieving the ultimate goal that a pipeline is wound in modularization as building blocks according to drawings by internet. In the prior art there is no similar machines for producing the pipeline. The intelligent modular spiral pipeline winding machine has a small size and low cost, and can achieve an easy process of construction on site, with an increased production efficiency and reduced production cost.

SUMMARY

The present invention aims to solve the problems in the prior art and provide a large aperture pipeline with high ring-stiffness, and an intelligent module spiral pipeline winding machine and a winding method thereof, with reduced cost, intelligent measure and control, and increased production efficiency. Technical solutions of the present invention will be described as followed.

One of objectives in the present invention is to provide an intelligent module pipeline which is such constructed that its cross section is a circular pipe formed of a plurality of intelligent module units clamped up and down and wound helically. The each intelligent module unit 1 is an arch-shaped module. A cylindrical pipeline is constituted by a plurality of intelligent module units being spirally wound in a staggered arrangement in axial direction. The each intelligent module unit 1 is provided with a reinforcing rib structure inside, a fixing device at lateral sides for fixing and locking each other from left to right, and a clamping device at edges for fixing and locking each other from up to down.

Further, the fixing device include a projection, a groove and fixing holes. The projection is provided on one end side surface of the each intelligent module unit, the groove is provided oppositely on other end side surface thereof, and the projection is latched into the groove by inserting pins through the fixing holes.

Further, there are two pairs of the fixing holes in upper and lower parts which extend through the more than half length of the each intelligent module unit.

Further, the clamping device includes an upper-left catching groove, a lower-left catching groove, an upper-right catching groove and a lower-right catching groove, the fixing between the adjacent intelligent module units is achieved by clamping the upper-left catching groove into the lower-right catching groove of another intelligent module unit in spiral winding pattern, and clamping the lower-left catching groove into the lower-right catching groove of the another intelligent module unit in spiral winding pattern, Further, the intelligent module units 1 which all have the same arch-shaped configuration, are spirally wound in a staggered arrangement such that there are 8.5, 16.5 or 22.5 pieces of intelligent module units 1 in each coil, wherein in the each coil the number of the pieces of the same units 1 is n plus a value which is equal to or greater than ½ and less than 1.

Further, the reinforcing rib structure includes several layers from outside to inside as followed: a first square grid layer, a semi-arc spiral layer, a spiral sheet strip square groove layer and a second square grid layer. A switchable circular hole is provided between the semi-arc spiral layer and the spiral sheet strip square groove layer, a first friction surface is arranged on a side face of the first square grid layer, a second friction surface is arranged on a side face of the second square grid layer, and the first friction surface contacts tightly with the second friction surface of another intelligent module unit to increase support force between the intelligent module units.

Further, the circular pipeline has a diameter of 600 to 6000 mm, the pipeline acting as a pipe rack for person to pass through when the diameter is greater than or equal to 2500 mm. The pipe rack is provided with cables, drainage pipelines and holders inside, thereby storing and discharging rainwater in the bottom.

Further, the switchable circular hole of the pipe rack is provided outside with sponges for absorbing rainwater, and is controlled to be opened to allow rainwater to flow in when raining and is controlled to be closed when not raining.

Further, leakage detection chips and moisture diagnosis devices are arranged inside the intelligent module units located in middle or bottom location of the circular pipeline. Vibratory acoustic signals are transformed into electrical signals and transmitted to a central control room when there is a leakage or moisture, and therefore it can be determined whether there is a leakage by observing the change of oscillograms.

Further, the circular pipeline is formed of a plurality of intelligent module units spirally wound in automatic or manual assemble way. When the pipe is not buried underground, the spiral sheet strip square groove layer and a spiral sheet strip square groove layer of another intelligent module unit are spirally wound to form an equidistant track between themselves, and PVC profiles are imbedded into the equidistant track to be clamped thereto in spiral winding pattern, thereby smoothing inner and outer surface of the pipeline. When the pipe is used in health care room, the spiral semi-arc layer is spirally wound into a small pipe, whose outside is connected with a pump to introduce magnetic fluid, and PVC profiles are imbedded into the equidistant track to be clamped thereto in spiral wind, thereby smoothing inside and outside of the pipe in the middle of which there is a cyclic and dynamic magnetic field.

An intelligent module helical pipeline winding machine is provided which includes a frame and a working panel placed vertically, the working panel is provided with an arc-shaped chute groove on the front surface, and the arc-shaped chute groove is provided with at least one pair of feed rollers. The machine is further provided with a locking device, with a parallel twisting device provided on the top of the working panel. The same intelligent module units placed end to end are arranged on the arc-shaped chute rail, thereby locking the same intelligent module units connected end to end by means of the locking device, forming a semicircular pipe diameter by means of the feed rollers, and twisting the semicircular pipe diameter in parallel by means of the parallel twisting device to change the winding rail into a spiral rail. The working panel is provided with at least one pair of compression rollers on the back surface which compress the intelligent module units tightly to do work; wherein the intelligent module units are positioned on the compression rollers which are in an arc-shaped array, and then are rotated a turn to be locked and pressed tightly from left to right, and thus are formed a spiral winding pipeline in a staggered arrangement.

Further, the locking device fastens and locks the intelligent module units connected end to end by inserting bolts through the holes in the units.

Further, the parallel twisting device twists parallelly by means of a pneumatic or electric or manual device to change the winding rail.

Further, the arc-shaped chute rail can be adjusted according to the arc size of the intelligent module units, and can change with same radian as the arc-shaped array of the compression rollers on the back surface of the working panel. The arc of the arc-shaped chute rail is coaxial to the arc-shaped array of the compression rollers on the back surface of the working panel.

Further, the parallel twisting device is provided with a cylinder which exerts pressure on the top of the semicircular pipe to change the winding rail into a spiral rail.

Further, the working panel is provided with at least one pair of compression rollers for pressing tightly the intelligent module units.

Further, the compression rollers are provided with locating rings to position the intelligent module units.

Further, it also includes a power device to power the compression rollers.

An intelligent module spiral pipeline winding method is provided which includes the following steps: the same intelligent module units are placed end to end on the arc-shaped chute rail; the intelligent module units placed end to end are fastened and locked by means of the locking devices; the semi-circular pipe diameter is formed by means of the feed rollers; and then the semi-circular pipe diameter is twisted parallelly by a parallel twisting device (106) to change the winding rail, thus forming a spiral wound pipeline in a staggered arrangement.

The advantages and beneficial effects of the present invention are as followed.

The module units of the pipeline are modelled and practically analyzed by finite element software, and ring-stiffness of the pipeline is determined by the size of the arch-shaped module units. The intelligent module units in the present invention are injection moulded or compression moulded in standardization from plastics or high stress tolerance materials at factories. The each intelligent module unit is provided with dark fringe friction surfaces on both of side faces to increase friction force between contact surfaces, and is provided with the projection, the groove and the fixing holes at both of end sides to achieve a riveted fixing. The intelligent modules whose number of pieces is equal to or greater than n plus ½ are spirally wound in every layer, and are provided with arc-shaped catching groove structures on the both of side faces to make a fixing, and therefore the pipeline can be fixed integrally and against outward thrust resulted by the arc pressed such that the pipeline can support a large load and has a greatly enhanced ring stiffness. The pipeline is smooth on inner wall and is joined with soil at its outer square grids to unify itself with soil, such that the pipeline has a high resistance to displacement. Multiple intelligent module units can be packaged and transported to a construction site, arranged in sequence according to drawings, and then can be spirally wound in automatic or manual way, thus greatly reducing the high cost of transportation and extending its service life. The pipeline so formed suits to large-size pipe racks and small-size pipelines, can be standardly injection moulded or compression moulded in a modular way, and can be assembled on site. The problem can be solved that it is difficult to find out the failure occurring during the bury of underground pipelines, by providing intelligent module units and leakage detection chips, detecting acoustical signals and transforming the acoustical signals into electric signals and then transmitting the electrical signals to the central control room, and observing the change of oscillograms to determine whether there is a leakage. The initiative application of the intelligent detection devices in the detection of underground pipelines and the collection of rainwater in sponge cities are achieved in the present invention.

The machine in the present invention has a simple structure. The fixing between two adjacent intelligent modules and the forming of the semi-circular pipeline are achieved by placing a plurality of same intelligent module units, which are provided with through holes, end to end on the arc-shaped chute groove, and passing the locking device through the through holes of the intelligent module units. Parallel change of the winding rail is achieved by the parallel twisting device. It is particularly key that the winding of the pipeline is achieved by using the arc shape of the intelligent module units instead of circular arc rail in conventional machines, which is unlike to forming of circle ring by circular arc rail in the convention. The arc length of the intelligent module units 1 can be determined by the equation that the arc length equals to the pipe diameter divided by n and then multiplied by $\pi$ plus y, n is the number of pieces of module units in each circle which is known, and y is a staggered value added. The arc length staggered value added is particularly crucial. It is proved experimentally that the winding in a staggered arrangement cannot be achieved without the staggered value added. Inventors find accidentally that the winding in a staggered arrangement and the great increase of ring-stiffness of the pipeline can be achieved by adding the staggered value. Further, the arc-shaped chute rail which is variable circular arc is provided in the invention, and can overcome outward thrust force resulted from the circular ring pressed. Thus various kinds of pipeline with different diameters can be processed on site, modularization and intellectualization of pipelines can be achieved, and various type of pipelines can be produced as building with block on site.

DETAILED DESCRIPTION

Technical solutions in embodiments of the present invention will be described in detail in combination with the drawings in the embodiments. The embodiments discussed here are only a part of embodiments of the present invention.

The technical solutions to solve the technical problems described above are as followed.

Figure 4:
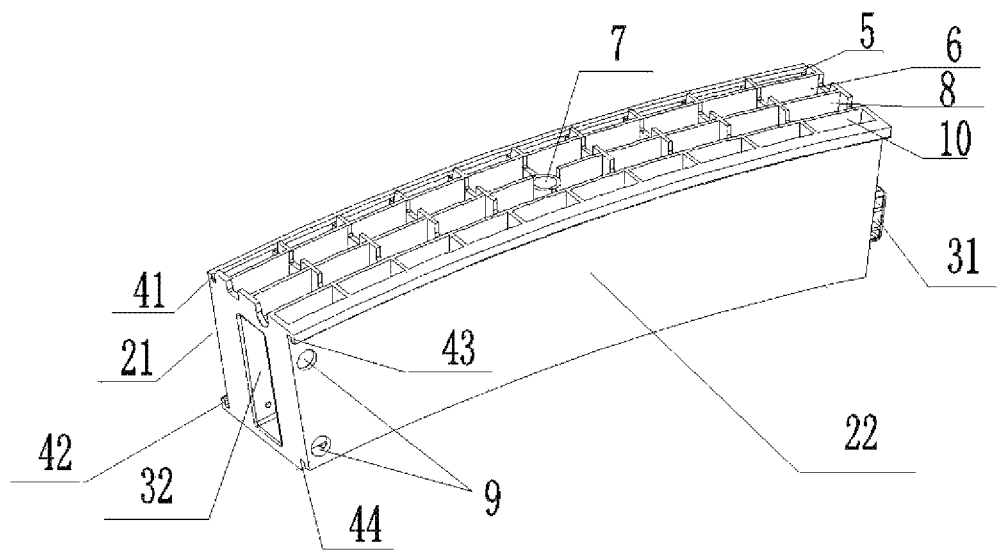
FIG. 4 is a schematic diagram of an intelligent module unit used in the preferred embodiments of the present invention.
Figure 5:
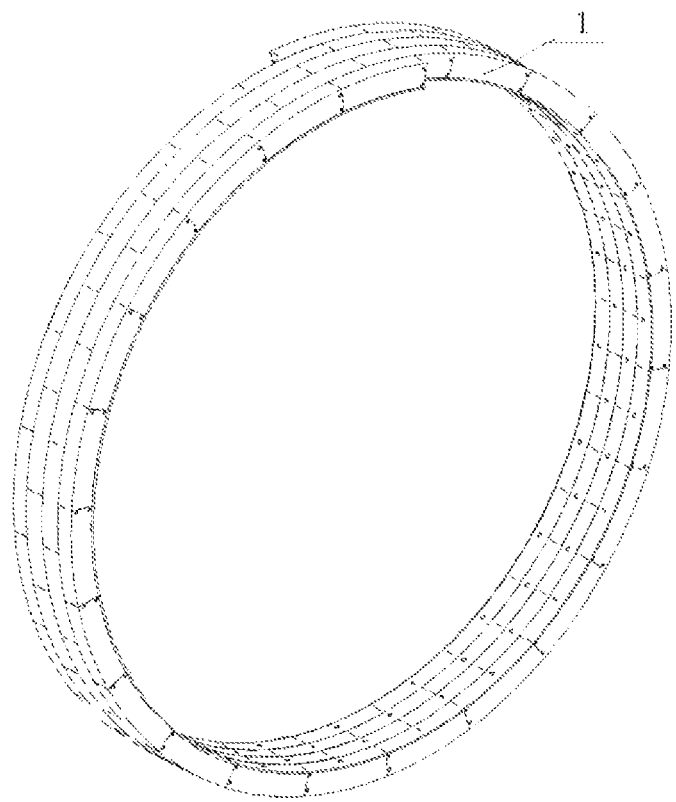
FIG. 5 is a schematic diagram of the intelligent module units assembled into a circular pipeline.
Figure 6:
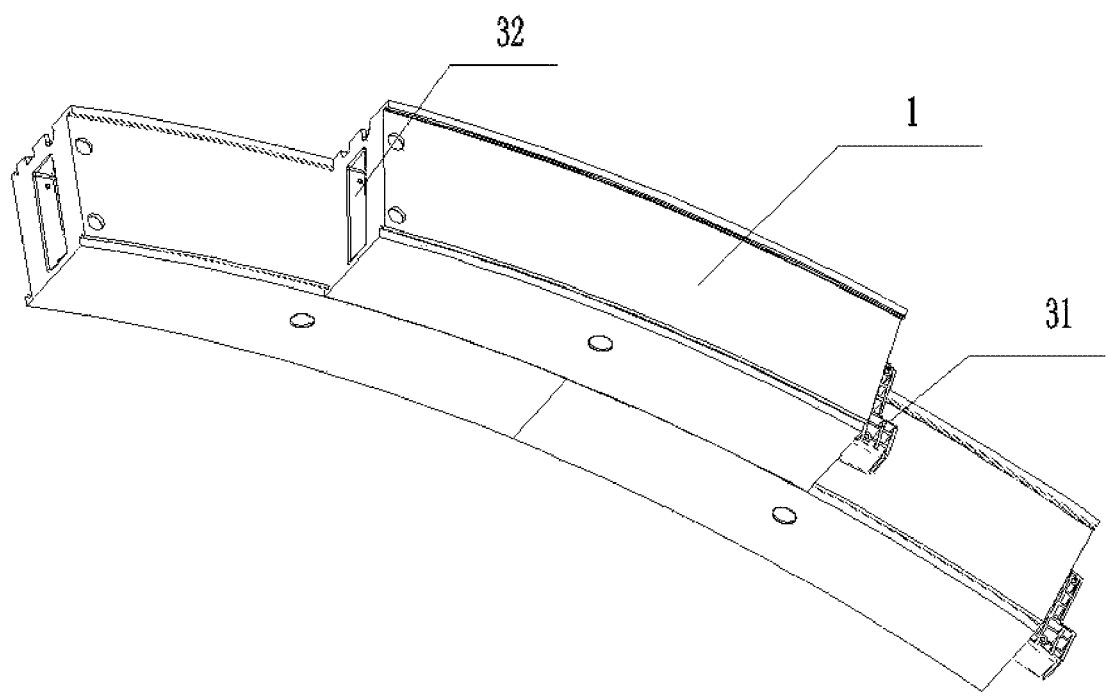
FIG. 6 is a schematic diagram of assembly of the intelligent module units in the preferred embodiments of the present invention.

Referring to FIG. 4-6 showing an intelligent module pipeline, a cross section of the pipeline is a circular pipe formed of a plurality of intelligent module units 1 clamped and wound helically. Each intelligent module unit 1 is an arch-shaped module made by injection moulding or compression moulding. A cylindrical pipeline is constituted by a plurality of intelligent module units spirally wound in a staggered arrangement in axial direction. The each intelligent module unit 1 is provided with a reinforcing rib structure in the inside, a fixing device on the side surface for fixedly clamping in a left-right direction, and a clamping device at the edge for fixedly clamping.

Preferably, the fixing device includes a projection 31, a groove 32 and fixing holes 9. The projection 31 is arranged on one end side surface of the each intelligent module unit 1, the groove 32 is arranged oppositely on other end side surface thereof and latches the projection 31 by inserting pins through the fixing holes 9.

Preferably, there are two pairs of fixing holes 9 in the up-down direction, which extend through the more than half length of the each intelligent module unit 1.

Preferably, the clamping device includes an upper-left catching groove 41, a lower-left catching groove 42, an upper-right catching groove 43 and a lower-right catching groove 44. The fixing between the adjacent intelligent module units 1 in the up-down direction is achieved by clamping the upper-left catching groove 41 in spiral winding pattern into the upper-right catching groove 43 of another intelligent module unit 1, and clamping the lower-right catching groove 41 in spiral winding pattern into the lower-right catching groove 44 of the another intelligent module unit.

Preferably, the intelligent module units 1 which all have the same arch-shaped configuration, are spirally wound in a staggered arrangement such that there are 8.5, 16.5 or 22.5 pieces of intelligent module units 1 in each coil, wherein in the each coil the number of the pieces of the same units 1 is n plus a value which is equal to or greater than ½ and less than 1. It is noted that the spiral winding between the intelligent module units can be achieved only when the said value is equal to or greater than ½ and less than 1.

Preferably, the each reinforcing rib structure consists of several layers from outside to inside as followed: a first square grid layer 5, a semi-arc spiral layer 6, a spiral sheet strip square groove layer 8 and a second square grid layer 10. A switchable circular hole 7 is provided between the semi-arc spiral layer 6 and the spiral sheet strip square groove layer 8. A first friction surface 21 is arranged on a side surface of the first square grid layer 5, a second friction surface 22 is arranged on a side surface of the second square grid layer 10, and the first friction surface 21 contacts tightly with the second friction surface 22 of another intelligent module unit to increase support force between the intelligent module units.

Preferably, the circular pipeline has a diameter of 600 to 6000 mm. When the diameter greater than or equal to 2500 mm, the pipeline acts as a pipe rack for person to pass through. The pipe rack is provided with cables, drainage pipes and holders inside, and can store and discharge rainwater in the bottom.

Preferably, the switchable circular holes 7 in the pipe rack is provided outside with sponges for absorbing rainwater. A switch is opened to control the switchable circular holes 7 such that the holes 7 absorb rainwater and the absorbed rainwater flows to the bottom of the pipe rack when it is raining, and the holes 7 is closed when it is not raining.

Preferably, leakage detection chips and moisture diagnosis devices are arranged inside the intelligent module units 1 located in the middle or bottom of the pipe rack. When there is some leakage or moisture, vibratory acoustic signals are transformed into electrical signals and transmitted to a central control room, and therefore it can be determined whether there is some leakage by observing the change of oscillograms.

Preferably, the circular pipeline is formed of the a plurality of intelligent module units 1 spirally wound by automated or manual assembly process. When the pipeline is not buried underground, the spiral sheet strip square groove layer 8 and a s spiral sheet strip square groove layer 8 of another intelligent module unit are spirally wound to form an equidistant track between themselves, and PVC profiles are imbedded into the equidistant track to be clamped thereto in spiral winding pattern, thereby smoothing inner and outer surfaces of the pipeline. When the pipeline is used in health care room, the semi-arc spiral layer 6 can be spirally wound into a small pipe whose outside is connected with a pump to introduce magnetic fluid, and PVC profiles are imbedded into the equidistant track to be clamped thereto in spiral winding pattern, thereby smoothing inner and outer surface of the pipe in the middle of which there is a cyclic and dynamic magnetic field.

Operating principles of the present invention will be explained in the following. The module units of the pipeline are modelled and practically analyzed by finite element software, and ring-stiffness of the pipeline is determined by the size of the arch-shaped module units. The intelligent module units in the present invention are injection moulded or compression moulded in standardization from plastics or high stress tolerance materials at factories. The each intelligent module unit is provided with dark fringe friction surfaces on both of side faces to increase friction force between contact surfaces, and is provided with the projection, the groove and the fixing holes at both of end sides to achieve a riveted fixing. The intelligent modules whose number of pieces is equal to or greater than n plus ½ are spirally wound in every layer in a staggered arrangement, and are provided with arc-shaped catching groove structures in upper and lower on the both of side faces to make a fixing, and therefore the pipeline can be fixed integrally and against outward thrust resulted by the arc pressed such that the pipeline can support a large load and has a greatly enhanced ring stiffness. The pipeline is smooth on inner wall and is joined with soil at its outer square grids to unify itself with soil, such that the pipeline has a high resistance to displacement. Multiple intelligent module units can be packaged and transported to a construction site, arranged in sequence according to drawings, and then can be spirally wound in automatic or manual way, thus greatly reducing the high cost of transportation and extending its service life. The pipeline so formed suits to large-size pipe racks and small-size pipelines, can be standardly injection moulded or compression moulded in a modular way, and can be assembled on site. The problem can be solved that it is difficult to find out the failure occurring during the bury of underground pipelines, by providing intelligent module units and leakage detection chips, detecting acoustical signals and transforming the acoustical signals into electric signals and then transmitting the electrical signals to the central control room, and observing the change of oscillograms to determine whether there is a leakage. The initiative application of the intelligent detection devices in the detection of underground pipelines and the collection of rainwater in sponge cities are achieved in the present invention.

Figure 1:
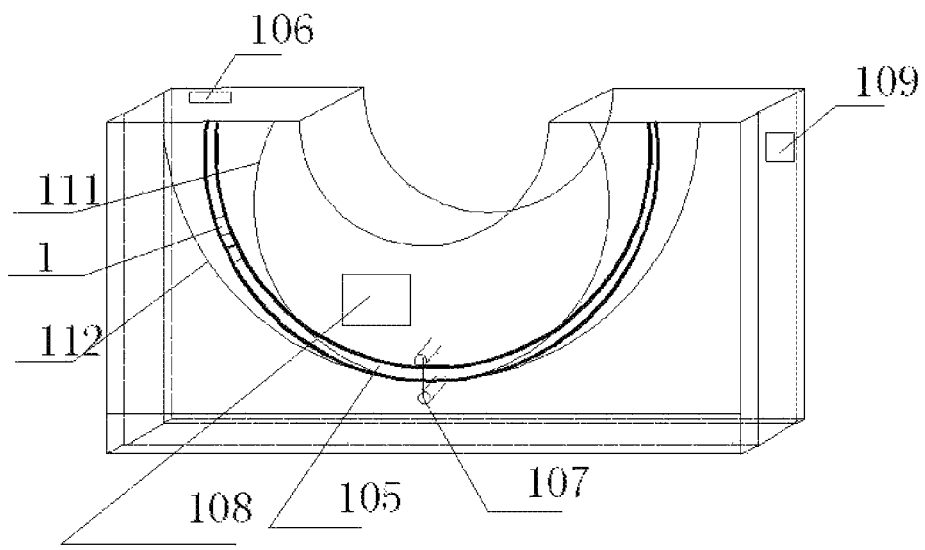
FIG. 1 is a front side schematic diagram of an intelligent module spiral pipeline winding machine in preferred embodiments of the present invention.
Figure 2:
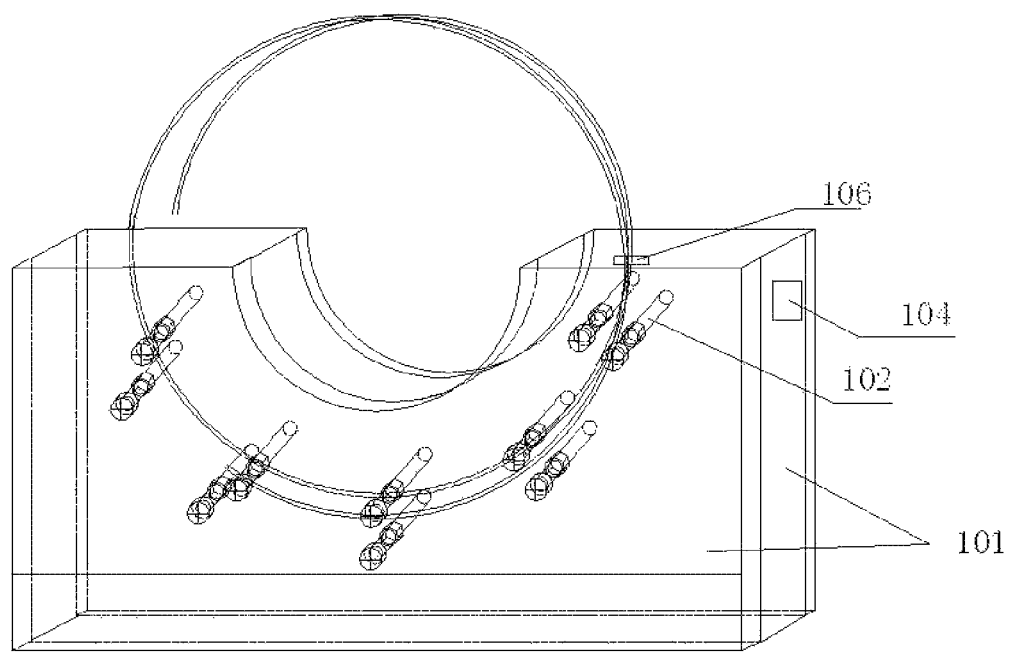
FIG. 2 is a back side schematic diagram of the intelligent module spiral pipeline winding machine in the preferred embodiments of the present invention.
Figure 3:
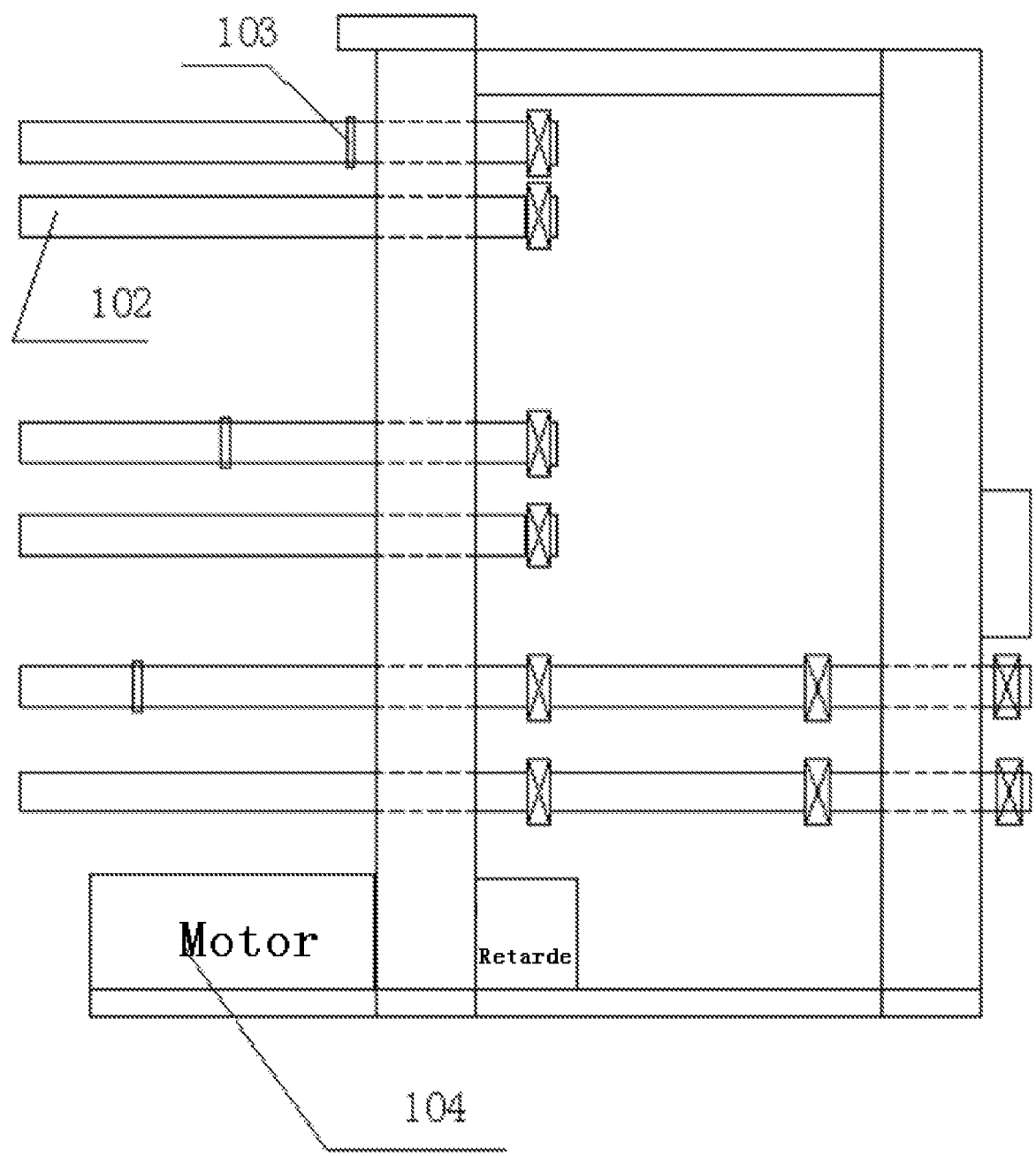
FIG. 3 is a lateral side schematic diagram of the intelligent module spiral pipeline winding machine in the preferred embodiments of the present invention.

Referring to FIGS. 1 to 3 showing an intelligent module helical pipeline winding machine, the winding machine includes a frame, and a working panel 101 placed vertically which is provided with an arc-shaped chute rail 105 on its front surface, with one pair of feed rollers 107 provided on the arc-shaped chute rail 105. The winding machine is characterized in that it is further provided with a locking device 108, with a parallel twisting device 106 provided on the top of the working panel 101. The same intelligent module units 1 placed end to end are arranged on the arc-shaped chute rail 105, and then are locked by means of the locking device 108; thus, a semicircular pipe diameter is formed by means of the feed rollers 107, and then is twisted parallelly by means of the parallel twisting device 106 to change the winding rail into a spiral rail. The working panel 101 is provided with at least one pair of compression rollers 102 on the back surface which compress tightly the intelligent module units 1 to do work. The intelligent module units are positioned on the compression rollers 102 which are in an arc-shaped array, and then are rotated a turn to be locked and pressed tightly from left to right, and thus are formed a spiral winding pipeline in a staggered arrangement.

Preferably, the locking device 108 fastens and locks the intelligent module units 1 connected end to end by inserting bolts through the holes in the units 1.

Preferably, the parallel twisting device 106 twists parallelly by means of a pneumatic or electric or manual device to change the winding rail into a spiral rail.

Preferably, the arc-shaped chute rail 105 can be adjusted according to the arc size of the intelligent module units 1, and can change with same radian as the arc-shaped array of the compression rollers 102 on the back surface of the working panel 101. The arc of the arc-shaped chute rail 105 is coaxial to the arc-shaped array of the compression rollers 102 on the back surface of the working panel 101.

Preferably, the arc length of the intelligent module units 1 can be determined by the equation that the arc length equals to the pipe diameter divided by n and then multiplied by n plus y, n is the number of pieces of module units in the each coil which is known, and y is a staggered value added.

Preferably, locating rings 103 in the compression rollers 102 are arranged spirally and upward.

Preferably, the machine further includes a power device 104 which powers the compression rollers 102.

An intelligent module spiral pipeline winding method is provided which includes the following steps: a plurality of same intelligent module units 1 are placed end to end on an arc-shaped chute rail 105; the intelligent module units 1 placed end to end are fastened and locked by means of a locking device 108; a semi-circular pipe diameter is formed by means of feed rollers 107; the semi-circular pipe diameter is twisted parallelly by a parallel twisting device 106 to change the winding rail into a spiral rail; the intelligent module units 1 are positioned on compression rollers 102 which are in an arc-shaped array; the intelligent module units 1 are rotated a turn to be fastened and pressed tightly from left to right; and the intelligent module units 1 are formed into a spiral wound pipeline in a staggered arrangement.

Preferably, the parallel twisting device 106 twists the semi-circular pipe diameter in parallel to change the winding rail into a spiral rail, and then the intelligent module units 1 are rotated a turn to form the pipeline whose inner or outer layer can be wounded into other plastic profiles in a staggered arrangement to form a multilayer pipe. Preferably, the parallel twisting device can have a parallel twisting angle of 5 or 10 degree which can be adjusted according to the size of the pipe diameter, thus winding in a staggered arrangement to form the spiral winding pipeline.

It should be understood that the embodiments described above are only for the explanation of the present invention but for limiting the scope of protection of the present invention. Technician in the field can make various modifications or changes of the invention which fall within the scope of protection determined by the claims, after reading what is described in the invention.

The invention claimed is:

1. An intelligent module pipeline characterized in that the pipeline is a cylindrical pipeline formed of a plurality of intelligent module units (1) which are fastened and locked end to end, and then are spirally wound with their lateral sides clamped each other; wherein the intelligent module units (1) which are arch-shaped modules injection or compression moulded, are spirally wound in a staggered arrangement in the axial direction; wherein the each intelligent module unit (1) is provided with a reinforcing rib structure inside, a fixing device at lateral sides for fixing and locking each other from left to right, and a clamping device at edges for fixing and locking each other;

wherein the clamping device includes an upper-left catching groove (41), a lower-left catching groove (42), an upper-right catching groove (43) and a lower-right catching groove (44), the fixing between the intelligent module units (1) is achieved by clamping the upper-left catching groove (41) into the lower-right catching groove (44) of another intelligent module unit (1) in spiral winding pattern, and clamping the lower-left catching groove (42) into the lower-right catching groove (44) of the another intelligent module unit (1) in spiral winding pattern.

2. The intelligent module pipeline according to claim 1 characterized in that the fixing device include a projection (31), a groove (32) and fixing holes (9), the projection (31) being provided on one end side surface of the each intelligent module unit (1), the groove (32) being provided oppositely on other end side surface thereof, and the projection (31) being latched into the groove (32) by inserting pins through the fixing holes (9).

3. The intelligent module pipeline according to claim 2 characterized in that there are two pairs of the fixing holes (9) in upper and lower parts which extend through the more than half length of the each intelligent module unit (1).

4. The intelligent module pipeline according to claim 1 characterized in that the intelligent module units (1) which all have the same arch-shaped configuration, are spirally wound in a staggered arrangement that is 8.5, 16.5 or 22.5 pieces of intelligent module units (1) in each coil, wherein in the each coil the number of the pieces of the same units (1) is n plus a value which is equal to or greater than ½ and less than 1.

5. An intelligent module pipeline characterized in that the pipeline is a cylindrical pipeline formed of a plurality of intelligent module units (1) which are fastened and locked end to end, and then are spirally wound with their lateral sides clamped each other; wherein the intelligent module units (1) which are arch-shaped modules injection or compression moulded, are spirally wound in a staggered arrangement in the axial direction; wherein the each intelligent module unit (1) is provided with a reinforcing rib structure inside, a fixing device at lateral sides for fixing and locking each other from left to right, and a clamping device at edges for fixing and locking each other;

wherein the reinforcing rib structure includes several layers from outside to inside as followed: a first square grid layer (5), a semi-arc spiral layer (6), a spiral sheet strip square groove layer (8) and a second square grid layer (10); wherein a switchable circular hole (7) is provided between the semi-arc spiral layer (6) and the spiral sheet strip square groove layer (8), a first friction surface (21) is arranged on a side face of the first square grid layer (5), a second friction surface (22) is arranged on a side face of the second square grid layer (10), and the first friction surface (21) contacts tightly with the second friction surface (22) of another intelligent module unit to increase support force between the intelligent module units.

6. The intelligent module pipeline according to any one of claim 1 characterized in that the cylindrical pipeline has one of:
    a diameter of 600 to 6000 mm; or
    a diameter that is greater than or equal to 2500 mm and functions as a pipe rack for a person to pass through, and the pipe rack is provided with cables, drainage pipelines and holders inside, thereby storing and discharging rainwater in the bottom.

7. The intelligent module pipeline according to claim 6 characterized in that the switchable circular hole (7) of the pipe rack is provided outside with sponges for absorbing rainwater, and is controlled to be opened to allow rainwater to flow in when raining and is controlled to be closed when not raining.

8. The intelligent module pipeline according to any claim 1 characterized in that leakage detection chips and moisture diagnosis devices are arranged inside the intelligent module units (1) located in middle or bottom location of the cylindrical pipeline; wherein vibratory acoustic signals are transformed into electrical signals and transmitted to a central control room when there is a leakage or moisture, and therefore it can be determined whether there is a leakage by observing the change of oscillograms.

9. The intelligent module pipeline according to claim 5 characterized in that the cylindrical pipeline is formed of a plurality of intelligent module units (1) spirally wound in automatic or manual assemble way; wherein, when the pipe is not buried underground, the spiral sheet strip square groove layer (8) and a spiral sheet strip square groove layer (8) of another intelligent module unit are spirally wound to form an equidistant track between themselves, and PVC profiles are imbedded into the equidistant track to be clamped thereto in spiral winding pattern, thereby smoothing inner and outer surface of the pipeline; wherein, when the pipe is used in health care room, the spiral semi-arc layer (6) is spirally wound into a small pipe whose outside is connected with a pump to introduce magnetic fluid, and PVC profiles are imbedded into the equidistant track to be clamped thereto in spiral wind, thereby smoothing inside and outside of the pipeline in the middle of which there is a cyclic and dynamic magnetic field.

10. An intelligent module spiral pipeline winding machine including a frame and a working panel (101) placed vertically, the working panel (101) being provided with an arc-shaped chute groove (105) on the front surface, the arc-shaped chute groove (105) being provided with at least one pair of feed rollers (107), characterized in that it is further provided with a locking device (108), with a parallel twisting device (106) provided on the top of the working panel (101); wherein the same intelligent module units (1) placed end to end are arranged on the arc-shaped chute rail (105), thereby locking the same intelligent module units (1) connected end to end by means of the locking device (108), forming a semicircular pipe diameter by means of the feed rollers (107), and twisting the semicircular pipe diameter in parallel by means of the parallel twisting device (106) to change the winding rail into a spiral rail; wherein the working panel (101) is provided with at least one pair of compression rollers (102) on the back surface which compress the intelligent module units (1) tightly to do work; wherein the intelligent module units are positioned on the compression rollers (102) which are in an arc-shaped array, and then are rotated a turn to be locked and pressed tightly from left to right, and thus are formed a spiral winding pipeline in a staggered arrangement.

11. The intelligent module spiral pipeline winding machine according to claim 10 characterized in that the locking device (108) fastens and locks the intelligent module units (1) connected end to end by inserting bolts through the holes in the units (1).

12. The intelligent module spiral pipeline winding machine according to claim 10 characterized in that the parallel twisting device (106) twists parallelly by means of a pneumatic or electric or manual device to change the winding rail into a spiral rail.

13. The intelligent module spiral pipeline winding machine according to claim 10 characterized in that the arc-shaped chute rail (105) can be adjusted according to the arc size of the intelligent module units (1), and can change with same radian as the arc-shaped array of the compression rollers (102) on the back surface of the working panel (101); wherein the arc of the arc-shaped chute rail (105) is coaxial to the arc-shaped array of the compression rollers (102) on the back surface of the working panel (101).

14. The intelligent module spiral pipeline winding machine according to any one of claim 10 characterized in that the arc length of the intelligent module units (1) can be determined by the equation that the arc length equals to the pipe diameter divided by n and then multiplied by $\pi$ plus y, n is the number of module units in the each coil which is known, and y is a staggered value added.

15. The intelligent module spiral pipeline winding machine according to claim 10 characterized in that locating rings (103) in the compression rollers (102) are arranged spirally and upward.

16. The intelligent module spiral pipeline winding machine according to claim 15 characterized in that it further includes a power device (104) which powers the compression rollers (102).

17. An intelligent module spiral pipeline winding method characterized in that it includes the following steps:
providing the intelligent module spiral pipeline winding machine according to claim 10;
wherein, the plurality of same intelligent module units (1) are placed end to end on the arc-shaped chute rail (105); the intelligent module units (1) placed end to end are fastened and locked by the locking device (108); a semi-circular pipe diameter is formed by the at least one pair of feed rollers (107); the semi-circular pipe diameter is twisted parallelly by the parallel twisting device (106) to change the winding rail; the intelligent module units (1) are positioned on the at least one pair of compression rollers (102) which are in the arc-shaped array; the intelligent module units (1) are rotated a turn to be fastened and pressed tightly from left to right; and the intelligent module units (1) are formed into a spiral wound pipeline in a staggered arrangement.

18. The intelligent module spiral pipeline winding method according to claim 17 characterized in that the parallel twisting device (106) twists the semi-circular pipe diameter in parallel to change the winding rail, and then the intelligent module units (1) are rotated a turn to form the pipeline whose inner or outer layer can be wounded into other plastic profiles in a staggered arrangement to form a multilayer pipe.

19. The intelligent module pipeline according to claim 6 characterized in that the fixing device include a projection (31), a groove (32) and fixing holes (9), the projection (31) being provided on one end side surface of the each intelligent module unit (1), the groove (32) being provided oppositely on other end side surface thereof, and the projection (31) being latched into the groove (32) by inserting pins through the fixing holes (9).

20. The intelligent module pipeline according to claim 19 characterized in that there are two pairs of the fixing holes (9) in upper and lower parts which extend through the more than half length of each intelligent module unit (1).

* * * * *